(12) United States Patent
Bruce

(10) Patent No.: US 8,994,583 B2
(45) Date of Patent: Mar. 31, 2015

(54) METHOD AND DEVICE FOR CONTINUOUS WAVE RADAR MEASUREMENTS

(75) Inventor: Staffan Bruce, Jarfalla (SE)

(73) Assignee: Sivers IMA AB, Kista (SE)

( * ) Notice: Subject to any disclaimer, the term of this patent is extended or adjusted under 35 U.S.C. 154(b) by 215 days.

(21) Appl. No.: 13/810,040

(22) PCT Filed: Jul. 7, 2011

(86) PCT No.: PCT/EP2011/061532
§ 371 (c)(1),
(2), (4) Date: Jan. 14, 2013

(87) PCT Pub. No.: WO2012/007353
PCT Pub. Date: Jan. 19, 2012

(65) Prior Publication Data
US 2013/0127652 A1    May 23, 2013

(30) Foreign Application Priority Data
Jul. 16, 2010  (EP) .................................. 10169827

(51) Int. Cl.
*G01S 13/58*  (2006.01)
*G01S 13/74*  (2006.01)
(Continued)

(52) U.S. Cl.
CPC ............. *G01S 13/584* (2013.01); *G01S 5/0009* (2013.01); *G01S 5/0284* (2013.01); *G01S 5/0072* (2013.01); *G01S 13/825* (2013.01); *G01S 13/84* (2013.01)
USPC ................. 342/109; 342/42; 342/70; 342/118

(58) Field of Classification Search
CPC .................. G01S 5/0009–5/009; G01S 5/0284
USPC ......... 342/42–51, 70–72, 105, 109, 118, 125, 342/127
See application file for complete search history.

(56) References Cited

U.S. PATENT DOCUMENTS 3,984,835 A * 10/1976 Kaplan et al. ................... 342/44
4,109,247 A *  8/1978 Kaplan ........................... 342/50
(Continued)

FOREIGN PATENT DOCUMENTS

| EP | 2 073 036 A1 | 6/2009 |
| WO | WO-01/23906 A1 | 4/2001 |
| WO | WO-01/94974 A2 | 12/2001 |

OTHER PUBLICATIONS

International Search Report for PCT/EP2011/061532, mailed Sep. 16, 2011; ISA/EP.
(Continued)

*Primary Examiner* — Peter Bythrow
(74) *Attorney, Agent, or Firm* — Harness, Dickey & Pierce, PLC

(57) ABSTRACT

This invention relates to a method for determining at least one of a distance and a relative velocity by means of continuous wave radar measurements. The method includes generating a measurement signal in the form of a continuous wave radar signal; transmitting the measurement signal by means of an antenna (112); reflecting the measurement signal by means of a reflector (118), thereby providing a desired reflected measurement signal; receiving the desired reflected measurement signal; and determining at least one of a distance and a relative velocity between the antenna and the reflector by means of the desired reflected measurement signal. The reflection of the measurement signal involves asymmetrically modulating the measurement signal at the reflector. The determination of at least one of a distance and a relative velocity includes detecting the desired reflected measurement signal among several received reflections of the measurement signal, by means of information added by the asymmetric modulation.

12 Claims, 5 Drawing Sheets

(51) Int. Cl.
*G01S 13/00* (2006.01)
*G01S 13/08* (2006.01)
*G01S 13/82* (2006.01)
*G01S 13/84* (2006.01)
G01S 5/00 (2006.01)
G01S 5/02 (2010.01)

(56) References Cited

U.S. PATENT DOCUMENTS

| | | | | |
|---|---|---|---|---|
| 4,315,260 A * | 2/1982 | Kupfer | | 342/86 |
| 4,888,591 A * | 12/1989 | Landt et al. | | 342/44 |
| 4,912,471 A * | 3/1990 | Tyburski et al. | | 340/10.34 |
| 4,963,887 A * | 10/1990 | Kawashima et al. | | 342/44 |
| 5,164,732 A * | 11/1992 | Brockelsby et al. | | 342/44 |
| 5,233,353 A * | 8/1993 | Guena et al. | | 342/125 |
| 5,247,305 A * | 9/1993 | Hirata et al. | | 342/44 |
| 5,424,747 A * | 6/1995 | Chazelas et al. | | 342/70 |
| 5,446,462 A * | 8/1995 | Cleveland | | 342/45 |
| 5,486,830 A * | 1/1996 | Axline et al. | | 342/43 |
| 5,606,574 A * | 2/1997 | Hasegawa et al. | | 375/130 |
| 5,649,295 A * | 7/1997 | Shober et al. | | 340/10.1 |
| 5,649,296 A * | 7/1997 | MacLellan et al. | | 455/39 |
| 5,774,795 A * | 6/1998 | Ando | | 455/106 |
| 5,796,362 A * | 8/1998 | Ayasli et al. | | 342/6 |
| 5,842,118 A * | 11/1998 | Wood, Jr. | | 455/101 |
| 6,084,530 A * | 7/2000 | Pidwerbetsky et al. | | 340/10.1 |
| 6,243,012 B1 * | 6/2001 | Shober et al. | | 340/572.7 |
| 6,456,668 B1 * | 9/2002 | MacLellan et al. | | 375/283 |
| 6,658,336 B2 * | 12/2003 | Browne et al. | | 701/45 |
| 6,791,489 B1 * | 9/2004 | Richardson et al. | | 342/43 |
| 6,812,824 B1 * | 11/2004 | Goldinger et al. | | 340/10.1 |
| 6,816,106 B1 * | 11/2004 | Butler | | 342/45 |
| 6,868,073 B1 * | 3/2005 | Carrender | | 370/278 |
| 6,963,295 B1 * | 11/2005 | Greene et al. | | 341/70 |
| 6,963,301 B2 * | 11/2005 | Schantz et al. | | 342/125 |
| 7,180,402 B2 * | 2/2007 | Carrender et al. | | 340/10.1 |
| 8,195,422 B2 * | 6/2012 | Wilcox et al. | | 702/149 |
| RE45,061 E * | 8/2014 | Karr | | 342/44 |
| 2005/0200515 A1 * | 9/2005 | Cherniakov | | 342/51 |
| 2006/0232463 A1 * | 10/2006 | Burton et al. | | 342/42 |
| 2009/0195438 A1 * | 8/2009 | Kawai | | 342/127 |
| 2011/0260910 A1 * | 10/2011 | Gravelle et al. | | 342/118 |

OTHER PUBLICATIONS

International Preliminary Report on Patentability dated Jan. 22, 2013.

* cited by examiner

US 8,994,583 B2

METHOD AND DEVICE FOR CONTINUOUS WAVE RADAR MEASUREMENTS

CROSS-REFERENCE TO RELATED APPLICATIONS

This application is a 371 U.S. National Stage of International Application No. PCT/EP2011/061532, filed on Jul. 7, 2011, which claims priority to European Patent Application No. 10169827.2, filed on Jul. 16, 2010. The contents of the above applications are incorporated herein by reference in their entirety.

FIELD OF THE INVENTION

The present invention relates to a method for determining at least one of a distance and a relative velocity between objects by means of a continuous wave radar.

BACKGROUND OF THE INVENTION

In some environments where a large and heavy object is moved and there is a desired position at which the object is to be stopped, or a border which must not be passed, distance measurements by means of radar technology has proved to be useful. Typically, a transceiver device (transmitter and receiver) is arranged on the moving object, and a reflector device is arranged at a fixed reference position. By transmitting a radar signal at radio frequency, i.e. an RF signal, and detecting the reflection thereof it is possible to determine the distance between the transceiver and the reflector.

In many applications there are relatively high demands on the accuracy of the distance determination. In one accurate method that has been developed the frequency of the RF signal is swept over a sweep range, i.e. a frequency range, by discrete frequency steps, while being continuously transmitted. At each frequency the phase difference between the transmitted signal and the received reflected signal is determined. The frequency at each step is maintained long enough to allow the transmitted signal to return after reflection. This method is called stepped frequency continuous wave (SFCW) radar. By sweeping the sweep range stepwise, and detecting, for each frequency, the phase difference between the reflected signal and the transmitted signal, it is possible to determine the distance. Depending on the frequency of the RF signal the distance between the transceiver and the reflector constitutes a number of wavelengths, which also corresponds to a number of periods of the RF signal. With increasing frequency the number of periods will increase for the same distance, and the phase difference will change. Since the distance typically corresponds to several full periods plus a portion of a period, and the phase difference only gives information about that portion of a period, a single frequency measurement is not enough to determine the distance. By means of several phase difference measurements at different frequencies it is however possible to determine also the correct number of full periods, and thus the distance.

However, the transmitted radar signal has a certain physical width, meaning that usually many reflections are received from objects around the reflector. There is a problem in determining which one of the reflections originates from the reflector. Many efforts have been made during the years to provide an efficient solution. One example thereof is disclosed in WO 01/23906, which deals with CW radar signals in general. The transmitted RF signal is modulated at the reflector. By means of the modulation it is possible to suppress the unwanted reflections and easier filter out the reflection of interest. In WO 01/23906 it is suggested that the modulation can be an amplification, i.e. at the reflector the transmitted signal is amplified and retransmitted, rendering the amplitude of the received retransmitted signal significantly higher than the amplitude of the other reflections. This is however still not very reliable. Other proposed modulations, which enhances the possibility of identifying the reflection of interest, are frequency modulation and amplitude modulation.

For stepped frequency continuous wave distance measurements, as explained above, the phase difference between the transmitted signal and the received reflected signal is determined. The phase detector outputs a value that is related to cosines or sinus of the phase difference, which means that it outputs the same value for two different phase differences, one between 0 and 180 degrees and one between 180 and 360 degrees. The modulation of the signal at the reflector affects the phase of the signal. At the receiver there is no synchronization with the modulator at the reflector, which means that there is no phase information about the modulation as such. This causes an ambiguity as to which contribution the modulator brings at each point in time. Consequently, in order to make an accurate determination of the distance, it must be known at each point in time what is the phase contribution from the modulator.

SUMMARY OF THE INVENTION

It is an object of the present invention to provide a method for accurate distance determination by means of continuous wave radar measurements. This object is achieved by method according to claim 1.

Thus, in accordance with an aspect of the present invention, there is provided a method for determining at least one of a distance and a relative velocity by means of continuous wave radar measurements, comprising:

generating a measurement signal in the form of a continuous wave radar signal;

transmitting the measurement signal by means of an antenna;

reflecting the measurement signal by means of a reflector, thereby providing a desired reflected measurement signal;

receiving the desired reflected measurement signal; and determining at least one of a distance and a relative velocity between the antenna and the reflector by means of the desired reflected measurement signal.

The operation of reflecting the measurement signal comprises asymmetrically modulating the measurement signal at the reflector, comprising applying a modulation signal which alternates between a first state and a second state, the duration of the first state differing from the duration of the second state. The operation of determining at least one of a distance and a relative velocity comprises identifying the desired reflected measurement signal, among several received reflections of the measurement signal, by means of the asymmetric modulation.

In accordance with another aspect of the present invention, there is provided a device for determining at least one of a distance and a relative velocity by means of continuous wave radar measurements, comprising a transceiver device and a reflector device, wherein the transceiver device comprises:

a measurement signal generator, arranged to generate a measurement signal in the form of a continuous wave radar signal; and a transmitter, arranged to transmit the measurement signal, wherein the reflector device comprises:

a reflector, arranged to reflect the transmitted measurement signal; and a modulator for modulating the measurement signal in conjunction with reflecting it, thereby providing a desired reflected measurement signal, wherein the transceiver device further comprises:

a receiver, arranged to receive the desired reflected measurement signal; and a controller, arranged to determine at least one of a distance and a relative velocity between the transmitter and the reflector. The modulator is arranged to asymmetrically modulate the measurement signal, wherein the reflector device comprises a modulator controller arranged to switch the modulator between a first state and a second state, the duration of the first state differing from the duration of the second state. The controller is further arranged to identify the desired reflected measurement signal, among several received reflections of the measurement signal, by means of the asymmetric modulation.

By means of the asymmetric modulation, it is possible to determine what is the actual contribution from the modulator, since the contribution is irregular. Since the two states have different durability the modulation not only makes the signal easier to find among other reflections, but additionally it simplifies the determination of what contribution the modulation has in every instance, and thereby the determination of the true state of the received measurement signal. It should be noted that the method is not only applicable to stepped frequency continuous wave radar but also to continuous wave radar in general. For example, it is applicable to frequency modulated continuous wave radar (FMCW). FMCW differs from SFCW in that the frequency is continuously swept over the frequency range, and the difference in frequency between the currently transmitted signal and the received signal is detected, and a distance is determined by means of that frequency difference and the time lapsed since the signal having the same frequency as the received signal was transmitted. In the FMCW case as well, the desired reflected measurement signal is easier and more accurately detectable when asymmetrically modulated.

In accordance with an embodiment of the method, said asymmetrically modulating the measurement signal at the reflector comprises asymmetrically phase modulating the measurement signal. The phase modulation provides for a simple implementation of a modulator, which is also power efficient.

In accordance with an embodiment of the method, said asymmetrically modulating the measurement signal at the reflector comprises asymmetrically amplitude modulating the measurement signal.

In accordance with an embodiment of the method, the asymmetric modulation of the measurement signal at the reflector comprises asymmetrically amplitude modulating the measurement signal. This is another useful and power efficient type of modulation. Phase modulation and amplitude modulation are combinable as well.

In accordance with an embodiment of the method, the determination of at least one of a distance and a relative velocity comprises detecting a phase difference between the desired reflected measurement signal and the transmitted measurement signal. In order to identify the desired reflected measurement signal among several received signals which have been reflected on different surfaces, the phase difference is an advantageous measure to operate on, in particular when the asymmetric modulation includes phase modulation.

In accordance with an embodiment of the method, it further comprises generating a phase value as one of a cosine or sine value of the phase difference. The asymmetric modulation causes changes in phase and/or amplitude, which significantly and detectably affect such a cosine or sine value.

In accordance with an embodiment of the method, the determination of at least one of a distance and a relative velocity comprises identifying the first and second states and their different durations in the desired reflected measurement signal.

In accordance with an embodiment of the method, the first and second states are provided one of different phase shifts and different amplitude levels. Thus, by enabling the identification of the first and second states of the modulation signal at the transceiver, it is easier to correctly remove the influence of the modulation from a determined phase and/or amplitude without any synchronization with the modulator, and additionally to determine correct properties of the very measurement signal.

In accordance with an embodiment of the method, said identifying comprises studying a phase value during an integer number of periods of the modulation signal.

These and other aspects, features, and advantages of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Figure 1A:
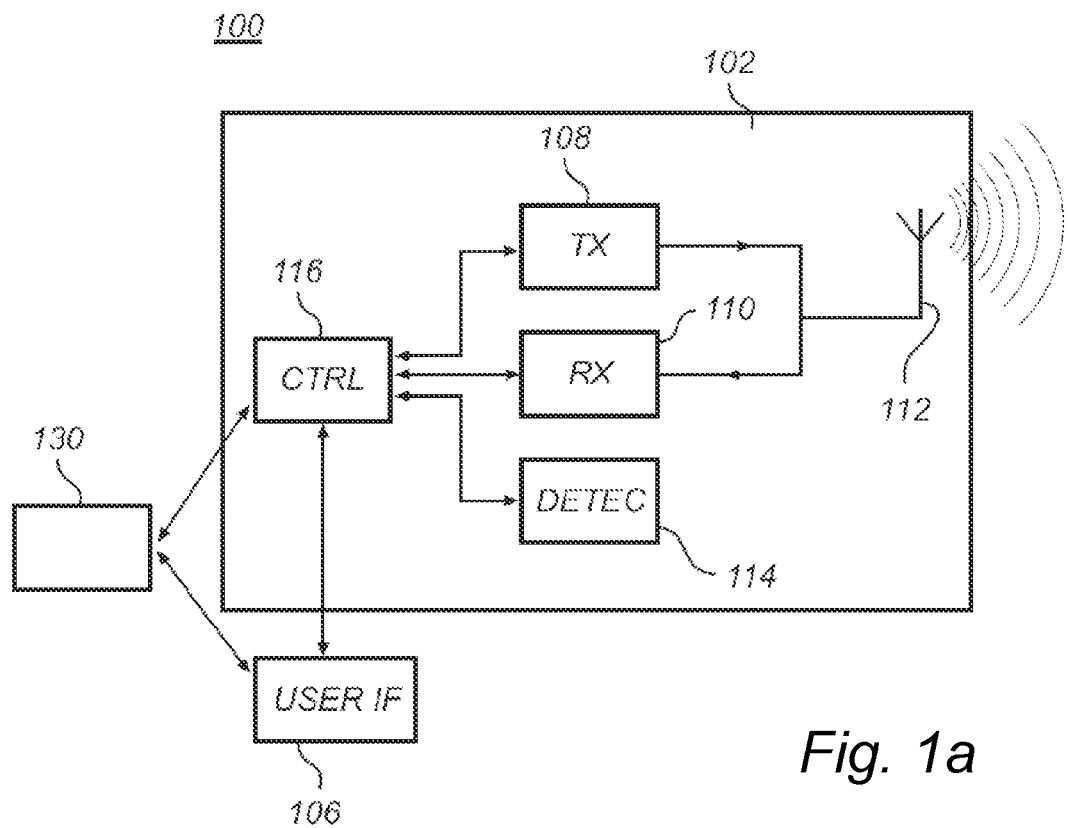
FIGS. 1a and 1b are schematic block diagrams of an embodiment of the device according to the present invention.
Figure 1B:
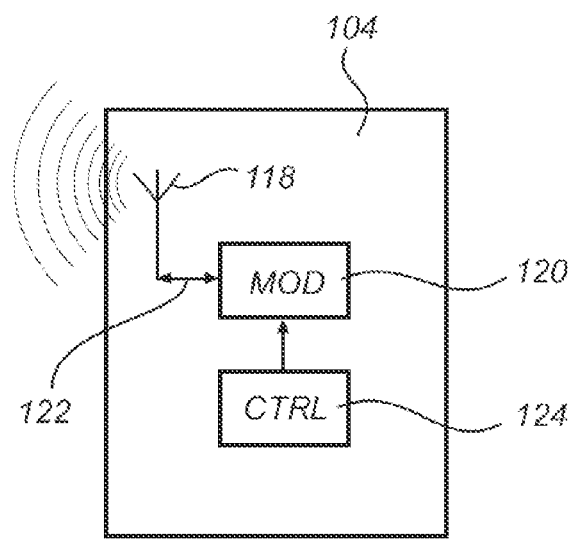

According to an example of a continuous wave radar measurement system, as shown in FIGS. 1a and 1b, according to the present invention, the measurement system 100 comprises a transceiver device 102, a reflector device 104, and a user interface 106, which is connected with the transceiver device 102. For instance, the measurement system 100 is used for distance measurements. The distance information is usable in different ways. For example the measurement system 100, and more particularly the transceiver device 102, is connected with a stop device 130. The stop device 130 is used for controlling the movement a movable object at which the transceiver device, or the reflector device 104, is arranged. According to one practical application, railway wagons are loaded with bulk material, such as iron ore, coal, or gravel. The loading is automatic or semiautomatic. The wagons are moved one at a time to a predetermined loading position, where they are loaded. For each wagon, the measurement system 100 is used for determining when the wagon has reached the loading position. A transceiver device 102 is mounted on each wagon. A reflector device 104 is mounted just beyond the loading position. When the wagon is approaching the loading position, there is a preset alert distance, at which the transceiver device sends an alert signal to the stop device 130, which in turn activates the brakes of the wagon. The stop device 130 then cooperates further with the measurement system 100 in order to finally stop the wagon at the loading position. In comparison to prior art systems used, the present system is more reliable and fast in determining a correct distance, which can be used for making the loading process faster. This is because the wagons can be driven closer to the loading point at full velocity before the brakes have to be activated and the braking can be done more forceful and at a shorter time.

Another application example is using the continuous wave radar measurement system 100 in a collision protection apparatus of a traverse in an industrial building. The transceiver device 102 of the measurement system 100 is mounted on the traverse and the reflector device 104 is mounted on a fixed structure, such as a wall of the building. By means of the measurement system 100, being arranged for determining the distance between the transceiver device 102 and the reflector device 104, the operator of the traverse gets a warning signal on the user interface 106 when the traverse comes too close to the fixed structure. Additionally, a stop device 130 connected with the distance measurement system 100 automatically forces the traverse to stop if it still reaches a critical minimum distance to the fixed structure. Alternatively, the reflector device 104 is mounted on another traverse.

The user interface is employable for different purposes in different applications, such as displaying measurement data, e.g. distance to reflector device or relative velocity, generating alerts, displaying information about object position, being used for operator input, etc. However, in some applications the user interface is omitted, e.g. if the system is automatic or semi-automatic, and the system operates merely internally. The transceiver device 102, more particularly, includes a transmitter 108, a receiver 110, and an antenna 112, connected with the transmitter 108 and the receiver 110. Further, the transceiver device 102 comprises a detector 114, connected with the receiver 110, and a controller 116, connected with the transmitter 108, the receiver 110, and the detector 114. The controller 116 is furthermore connected with the user interface 106.

The reflector device 104 comprises a reflector, which can also be considered an antenna, 118, a modulator 120 connected with the reflector 118 via a waveguide 122, and a modulator controller 124, connected with the modulator.

According to an embodiment of a method for determining a distance, the measurement system 100 is an SFCW radar measurement system and operates as follows. The transmitter 108 generates a measurement signal in the form of a stepped frequency continuous wave radar signal. The measurement signal typically is an RF signal at GHz frequency, and, for example, it is swept step-by-step over a sweep range of about 50 MHz from a start frequency of 10.5 GHz. Each step is 1 MHz. The measurement signal is transmitted by means of the antenna 112, and it is reflected by means of the reflector 118, which thereby provides a reflected measurement signal. Before returning the measurement signal the reflector device 104 modulates it asymmetrically with regard to phase. The asymmetric modulation is performed by the modulator 120 under control of the modulator controller 124 applying a modulation signal to the modulator 120. Thus, the modulation signal alternates between a first state and a second state, wherein the duration of the first state differs from that of the second state. Then the reflected measurement signal is received at the receiver 110, which forwards the received signal to the detector 114, which is a phase detector. The phase detector 114 compares the received signal, i.e. the reflected measurement signal, with the transmitted signal, i.e. the measurement signal, and is able to determine the phase difference between them. The phase difference is determined several times during each frequency step, by sampling the received signal appropriately, typically at a sampling rate of several times the frequency of the modulation signal. According to one example, the modulation frequency is 16 kHz, and the sampling frequency is 304 kHz.

As mentioned above, in practice many different reflected signals are received at the receiver 110, i.e. the desired reflected measurement signal is mixed with noise. Due to the modulation at the reflector device 104 it is possible to distinguish the desired reflection from the noise, and due to the asymmetry, the correct phase difference within a period is readily determinable, as will be explained in more detail below. The frequency of the measurement signal is then incremented one step and the measurement is repeated. This is continued throughout the sweep range of the measurement signal, providing several phase difference values, one for each frequency of the measurement signal. Finally, the distance between the antenna 112 and the reflector 118 is determined by means of the several phase difference values. The distance determination is based on a relation between the bandwidth B of the sweep range and the distance D between the transmitter antenna 112 and reflector 118 as follows.

Figure 5:
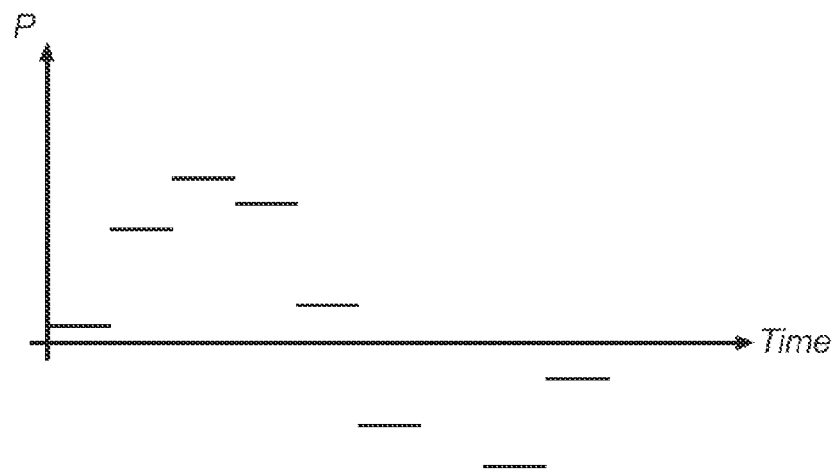
FIGS. 5 to 7 are graphs illustrating different signals.

The phase detector 114 outputs a phase difference value P which corresponds to cosine of the phase difference $\Delta(\Phi)$ between the transmitted signal and the received signal, i.e. $P=\cos(\Delta\Phi)$. Thus, the phase difference value P will vary between +1 and −1, while identifying a phase position between 0 and 180 degrees. Typically the distance corresponds to several full periods plus a portion of a period. For each frequency of the measurement signal, the phase detector is only capable of identifying the phase position within a half period. However, by using information about several different phase differences at different frequencies it is possible to determine also the total number of complete half periods. Taken over the sweep range of the measurement signal the phase difference values P will follow a cosine curve. This is schematically illustrated in FIG. 5, with a diagram of the phase difference value versus time for only a few frequency steps. The number of frequency steps is relatively large, such as 50 in the example above. For a wide enough sweep range and small enough frequency steps, there will be several zero crossings of the cosine curve. The distance is determined as the velocity of light c divided with the bandwidth B of the sweep range and the number of zero crossings K, that is:

$$D=c/(BK) \quad \text{(eqn. 1)}$$

Figure 6:
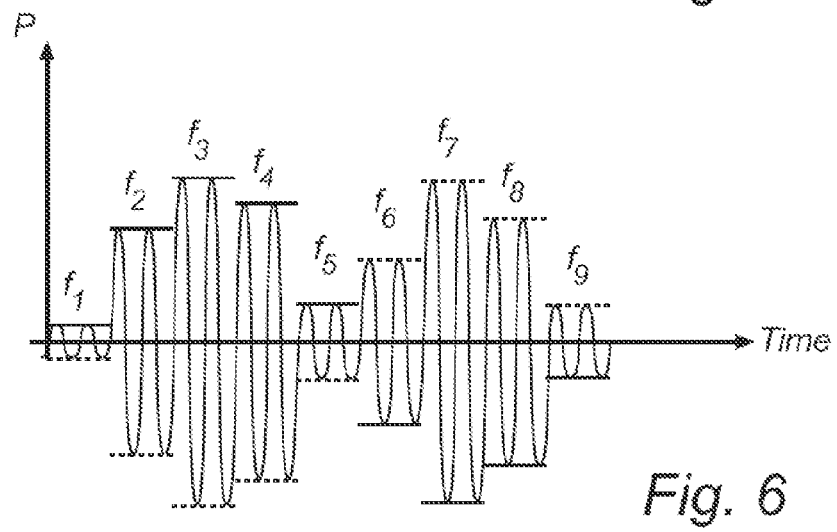

When the reflector device modulates the signal by a continuous modulation, the modulation information is embedded in the envelope of the resulting output of the phase detector. From that point of view, the envelope of the output of the phase detector is a double cosine wave, where one cosine wave is a mirror image of the other, as shown in FIG. 6. There is an ambiguity regarding what sign each respective sample should have, i.e. which envelope is true. This ambiguity is removed according to the present invention by means of the asymmetric modulation. Preferably, the phase modulation is approximately 0/180 degrees, which provides the largest difference in the detector output signal, but other phase shift combinations are feasible as well, provided that they generate a significant difference in the detector output signal.

Figure 2:
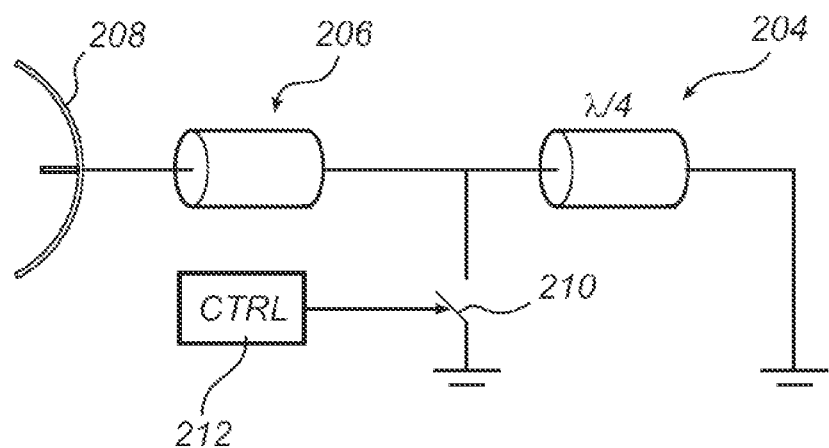
FIGS. 2 to 4 are schematic representations of different embodiments of a modulator, which is included in the device shown in FIG. 1.
Figure 3:
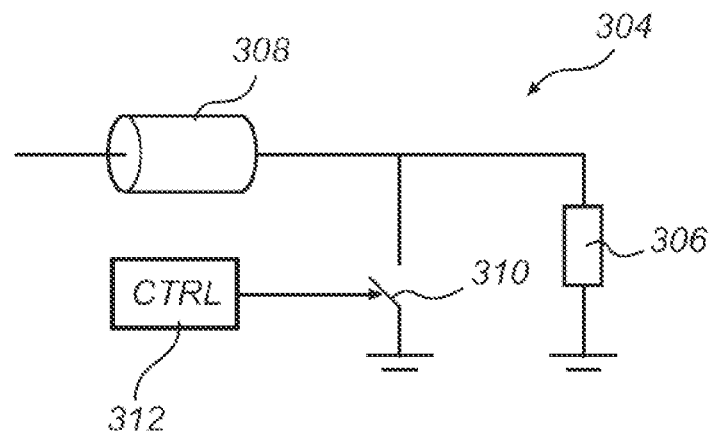
Figure 7:
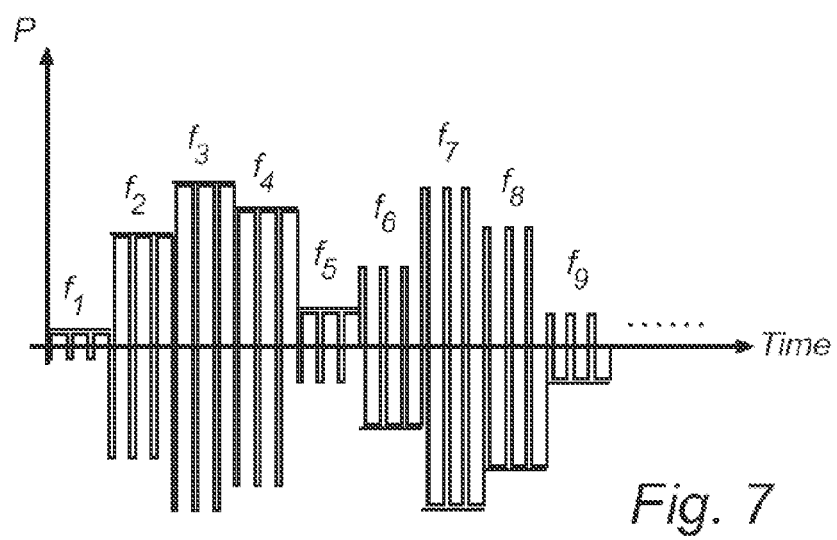

Several different modulator embodiments are employable. According to one embodiment, as shown in FIG. 2, the modulator is a phase modulator 204 of a simple kind. The phase modulator 204 has a wave guide 206 connected, at one end thereof, with the reflector 208, and, at the other end thereof, with ground. Measured from the grounded end, at about one fourth of the wave length, $\lambda/4$, of the RF signal to be reflected, preferably λ/4 of the measurement signal at centre of the sweep range, the wave guide 206 is furthermore connected with a switch 210, which is connected with ground as well. A modulator controller 212 is connected with the switch 210 for controlling the switching thereof. Thus, in a first switch position, i.e. when the switch 210 is closed, the measurement signal is reflected at a first ground connection, and in a second switch position, i.e. when the switch 210 is open, the measurement signal is reflected at a second ground connection, where it travels about half a wave length longer, corresponding to about 180 degrees of phase shift. The phase modulator 204 modulates the measurement signal asymmetrically by alternately switching between the two switch positions, and holding the switch for a longer time in one of the switch positions than in the other position. The asymmetric switching, i.e. phase modulation, of 180 degrees renders the output from the phase detector 114 a double cosine wave where phase values of one of the cosine waves have a longer duration than those of the other wave, as shown in FIG. 7. The controller 116 receives information about the phase values from the detector 114 and has information also about whether it is the first or the second switch position that is held the longer time. From this information the controller is able to determine the correct phase difference. The controller 116 studies the phase value which is output from detector during one period, or an integer number of periods, of the modulating sequence. One period is the time that the switch 210 of the phase modulator 204 is held open plus the time that the switch 210 is held closed. During the time of that period the phase value adopts one of the phase values for a longer time than the other, which makes it possible for the controller 116 to identify the different states of modulation.

According to another embodiment of the modulator it is an amplitude modulator 304 schematically illustrated as comprising a load 306 connected between the wave guide 308 and ground, a switch 310 arranged in parallel with the load and also connected to ground, and a modulator controller 312 controlling the operation of the switch 310. The modulator controller 312 controls the switch such that the wave guide 308 asymmetrically alternately is connected directly to ground and connected to the load 306. Thereby the amplitude of the reflected measurement signal is asymmetrically varied. The detector operates as follows on the asymmetrically amplitude modulated measurement signal. Data from a complete modulation period, consisting of a number of samples sufficient to uniquely distinguish between the different states of the modulation are processed. When the different states of modulation have been identified, one or more states are used to calculate the true detector output signal.

Figure 8:
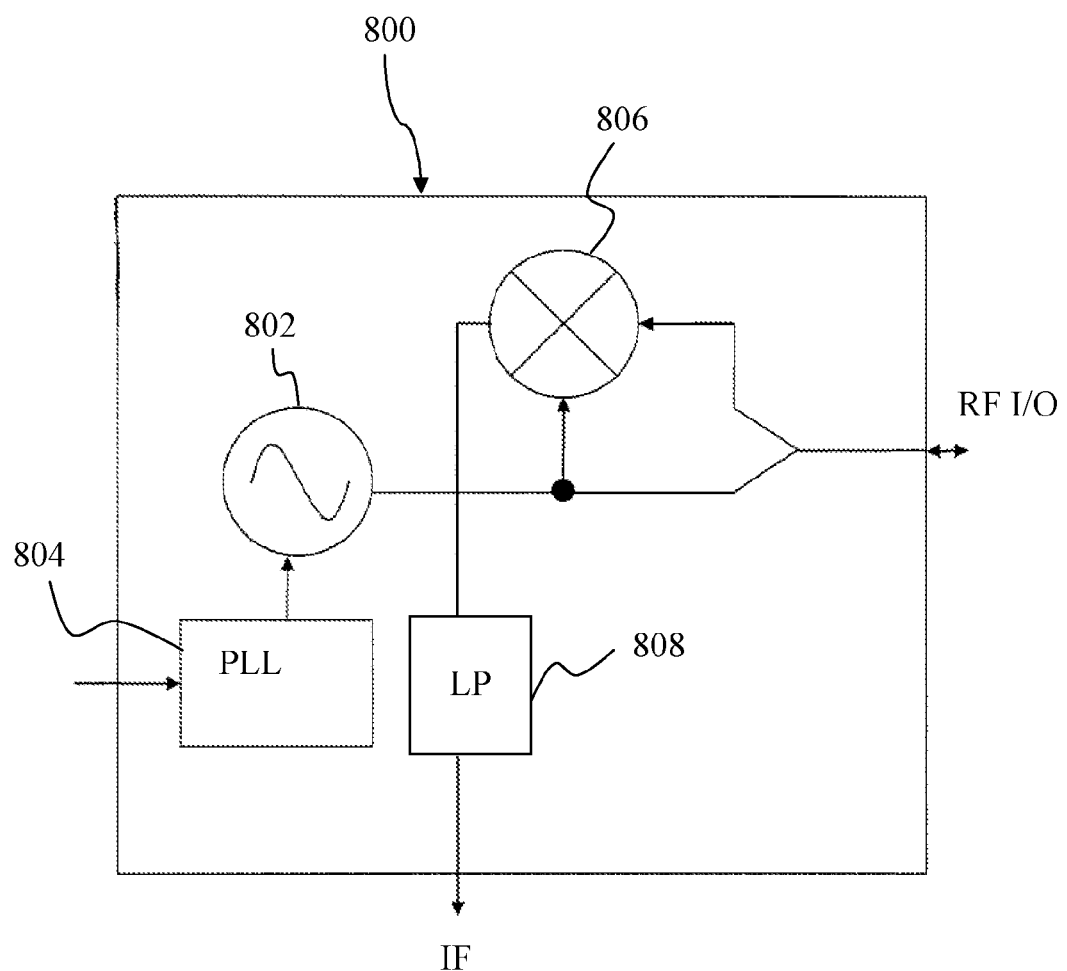
FIG. 8 is a schematic block diagram of an embodiment of a part of the device.

The transceiver is for instance implemented as follows, as shown in FIG. 8. The transceiver 800 comprises an oscillator 802 for generating an RF measurement signal, its output frequency being controlled by a PLL (Phase Locked Loop) 804. The measurement signal is output via a common input/output interface RF I/O to the antenna. Reflected signals are received via the input/output interface and are mixed with the measurement signal in a multiplier 806, and the resulting output signal is lowpass filtered 808. The multiplier 806 and LP filter 808 represent the detector 114. The output signal IF of the LP filter 808 is forwarded to the controller 116. This transceiver structure is most basic to a person skilled in the art, and therefore its operation will be no further described. It is simply noted that using this kind of receiver/detector structure, mathematically the detector output signal IF can be denoted as $A*\cos(\Delta\Phi)$. This means that the detector output signal is a combination of an amplitude value and a phase value, the amplitude value being dependent on inter alia the amplitude of the reflected measurement signal. Thus, phase variations as well as amplitude variations of the reflected measurement signal are identifiable in the detector output signal IF. Consequently, this transceiver structure is applicable to both those embodiments using phase modulation and those embodiments using amplitude modulation.

Figure 4:
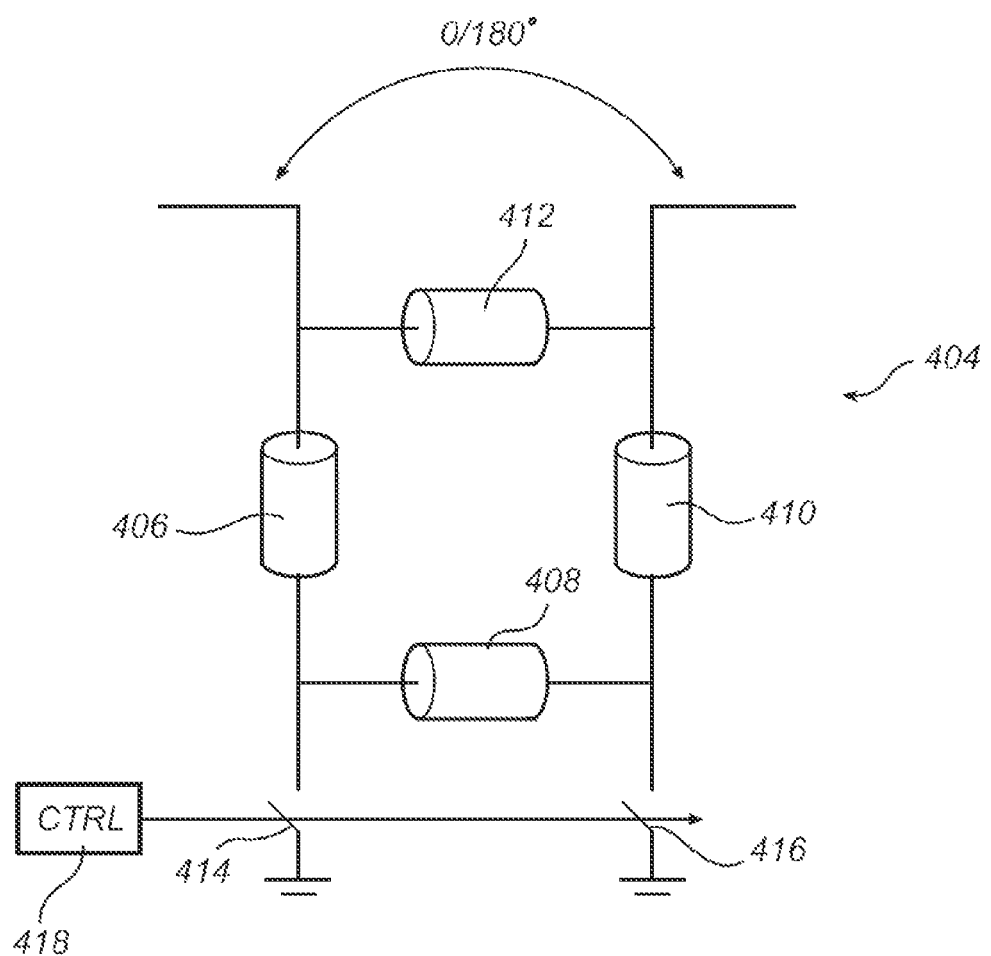

According to another embodiment of the modulator, as shown in FIG. 4, it is a phase modulator 404 comprising a wave guide bridge made of first, second, third, and fourth wave guide portions 406, 408, 410, 412, first and second switches 414, 416, and a modulator controller 418. The wave guide portions 406, 408, 410, 412 are bridge interconnected, which can be illustrated by means of an equivalent electric diagram where the wave guide portions are arranged in a square, constituting one side each of the square. A signal input is connected with the interconnected ends of the first and fourth wave guide portions 406, 412, and a signal output is connected with the interconnected ends of the third and fourth wave guide portions 410, 412. The first switch 414 is connected with the interconnected ends of the first and second wave guide portions 406, 408, and the second switch 416 is connected with the interconnected ends of the second and third wave guide portions 408, 410. The switches 441, 416 are grounded. The modulator controller alternately and asymmetrically closes and opens the switches in common, thereby causing zero and 180 degree phase shift respectively. This kind of phase modulator 404 is arrangeable both as a terminating module and as a passing by module in the wave guide path. In the latter case, another modulator, such as an amplitude modulator terminating the path is arrangeable at the output of the phase modulator 404, and thus a combination modulation is obtained.

The above embodiments have considered a fully steady state situation where the reflected signal of interest, i.e. the desired reflected measurement signal, has an identical frequency as that of the comparison signal, i.e. the measurement signal, used for detecting the received signal, such as is the case in SFCW radar measurements.

Several scenarios can be envisioned where the reflected signal and the comparison signal do not have the same frequency, such as in a Doppler radar measurement system or an FMCW radar measurement system, as will be exemplified below. Such a reflected signal can still easily be measured by means of the device and method according to the present invention. Assuming a discrete acquisition system, i.e. the receiver, detector, and controller in cooperation, the only requirement is that the sampling frequency of the acquisition system is at least twice that of the highest frequency component in the received signal. It is also necessary that the acquisition system has the capability to discretize the signal properly, i.e., that each sample is acquired during, ideally, an infinitesimally short time so that the sample corresponds to the signal at a single point in time. Generally, in order for the modulation to be effective, each modulation period must be sufficiently short in order to correspondingly enable a proper discretization of the measured signal. A rough estimate gives that the modulation frequency should be at least ten times the highest frequency of the measured signal. This corresponds to discretizing the measured signal over one tenth of its period. Over this stretch in time, the measured signal can be considered to be static, or in fact quasi static.

In order to give a practical example, consider the above-mentioned lowpass filtered detector output signal IF for a continuous wave radar measurement. When a continuous, modulated, signal is to be sampled, it needs to be discretized and then sampled. It can be assumed that the detector output signal resulting from an unmodulated reflected measurement signal, has a maximum signal frequency content of 1 kHz. For this, at least a 2 kHz sampling frequency, corresponding to a measurement taken every 500 micro seconds, is necessary. This sampling relates to the discrete points in time when the value of the signal is measured. The method employed here uses a faster modulation scheme in order to discretize the signal. In this case, the modulation frequency is 16 kHz, i.e., one modulation period stretches $\frac{1}{16}^{th}$ of the highest frequency component in the detector output signal IF. During one modulation period, thus corresponding to 63 microseconds, the detector output signal IF is sampled 19 times, corresponding to a 304 kHz sampling frequency. This is called sub-samples since these 19 sub-samples are used, through data processing by the controller, to generate one single measurement sample at 2 kHz. In other words, the signal is sampled 19 times during 63 micro seconds every 500 micro seconds. The 19 samples used for the demodulation and discretization are processed to generate a single measurement sample.

Thus, according to another embodiment of the method, a doppler measurement is performed in order to determine a relative velocity between the transceiver device and the reflector device. A measurement signal of fixed frequency is transmitted. However, due to the relative movement between the transceiver and the reflector, there will be a frequency difference between the reflected measurement signal and the currently transmitted measurement signal. It is no longer the case that the actual phase difference between the desired reflected measurement signal and the transmitted measurement signal is of interest. However, during each acquisition instance, which involves several sub-acquisitions, performed by means of the sub-sampling, over a complete integer number of modulations, a section of a sinewave-like signal is acquired. After a sufficient number of acquisitions, a sinewave-like signal can be reconstructed. It should be noted here that the modulation frequency must be substantially higher than the highest frequency component, which is possibly caused by undesired reflections, occurring in the reflected measurement signal. Keeping track of the time distance between the acquisitions will give the doppler shift in frequency occurring and the relative velocity can be calculated.

In a similar way, according to another embodiment of the method, FMCW measurements are performed. With a transmitted measurement signal that has a continuous frequency sweep, the detected signal will continuously vary as a sinewave-like signal very much as the doppler shifted signal. Here as well, a sinewave-like signal can be reconstructed that relates to the distance between the transceiver and the reflector, and in this case as well the asymmetric modulation facilitates the identification of the desired reflected measurement signal and the timing thereof.

Above, embodiments of the method and device according to the present invention as defined in the appended claims have been described. These should be seen as merely non-limiting examples. As understood by a skilled person, many modifications and alternative embodiments as well as other practical uses are possible within the scope of the invention. It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A method for determining at least one of a distance and a relative velocity by means of continuous wave radar measurements, comprising:

generating a measurement signal in the form of a continuous wave radar signal;
transmitting the measurement signal by means of an antenna;
reflecting the measurement signal by means of a reflector, thereby providing a desired reflected measurement signal;
receiving the desired reflected measurement signal; and
determining at least one of a distance and a relative velocity between the antenna and the reflector by means of the desired reflected measurement signal,
wherein
said reflecting the measurement signal comprising asymmetrically modulating the measurement signal at the reflector, comprising applying a modulation signal which alternates between a first state and a second state, the first state having a first duration, and the second state having a second duration, the first duration differing from the second duration;
said determining at least one of a distance and a relative velocity comprising identifying the desired reflected measurement signal, among several received reflections of the measurement signal, by means of the asymmetric modulation; and
said determining at least one of a distance and a relative velocity comprising detecting and sampling the desired reflective measurement signal in a way that generates samples which generally follow two sinusoidal curves, one for each of said first and second states, determining which sinusoidal curve represents which state by means of the first and second durations, choosing one of the sinusoidal curves for the determination of at least one of a distance and a velocity, and using information from several consecutive periods of the sinusoidal curve and knowledge about which state it represents for that determination.

2. The method according to claim 1, wherein said asymmetrically modulating the measurement signal at the reflector comprises asymmetrically phase modulating the measurement signal.

3. The method according to claim 1, wherein said asymmetrically modulating the measurement signal at the reflector comprises asymmetrically amplitude modulating the measurement signal.

4. The method according to claim 1, wherein said determining at least one of a distance and a relative velocity comprises detecting a phase difference between the desired reflected measurement signal and the transmitted measurement signal.

5. The method according to claim 4, further comprising generating a phase value as one of a cosine and a sine value of the phase difference.

6. The method according to claim 1, wherein said first and second states are provided as one of different phase shifts and different amplitude levels.

7. The method according to claim 1, wherein said identifying the first and second states comprises studying a phase value during an integer number of periods of the asymmetric modulation.

8. A device for determining at least one of a distance and a relative velocity by means of continuous wave radar measurements, comprising a transceiver device and a reflector device, wherein the transceiver device comprises:

a measurement signal generator, arranged to generate a measurement signal in the form of a continuous wave radar signal; and a transmitter, arranged to transmit the measurement signal, wherein the reflector device comprises:

a reflector, arranged to reflect the transmitted measurement signal; and a modulator for modulating the measurement signal in conjunction with reflecting it, thereby providing a desired reflected measurement signal, wherein the transceiver device further comprises:

a receiver, arranged to receive the desired reflected measurement signal; and a controller, arranged to determine at least one of a distance and a relative velocity between the transmitter and the reflector, wherein:

the modulator is arranged to asymmetrically modulate the measurement signal, wherein the reflector device comprises a modulator controller arranged to switch the modulator between a first state and a second state, the first state having a first duration, and the second state having a second duration, the first duration differing from the second duration;

the controller is arranged to identify the desired reflected measurement signal, among several received reflections of the measurement signal, by means of the asymmetric modulation;

the transceiver device further comprises a detector connected with the controller, wherein the detector is arranged to detect and sample the desired reflected measurement signal in a way that generates samples which generally follow two sinusoidal curves, one for each of said first and second states; and wherein the controller is arranged to determine which sinusoidal curve represents which state by means of the first and second durations, to choose one of the sinusoidal curves for the determination of at least one of a distance and a velocity, and to use information from several consecutive periods of the sinusoidal curve and knowledge about which state it represents for that determination.

9. The device according to claim 8, wherein the modulator comprises a phase modulator.

10. The device according to claim 8, wherein the detector comprises a phase detector, arranged to detect a phase difference between the measurement signal and the desired reflected measurement signal, the phase detector being connected with the controller for providing it with information about said phase difference.

11. The device according to claim 8, wherein the detector comprises an amplitude detector.

12. The device according to claim 8, comprising a stop device, which is arranged to control stopping of a movable object on basis of a determined distance.

* * * * *